US012042352B2

(12) United States Patent
Aminian et al.

(10) Patent No.: US 12,042,352 B2
(45) Date of Patent: Jul. 23, 2024

(54) BUTTERFLY ATTACHMENT FOR CLEAR ALIGNER THERAPY IN ORTHODONTICS

(71) Applicants: Amin Aminian, Cankaya Ankara (TR); Farnaz Younessian, Lake Forest, CA (US)

(72) Inventors: Amin Aminian, Cankaya Ankara (TR); Farnaz Younessian, Lake Forest, CA (US)

( * ) Notice: Subject to any disclaimer, the term of this patent is extended or adjusted under 35 U.S.C. 154(b) by 13 days.

(21) Appl. No.: 17/870,248

(22) Filed: Jul. 21, 2022

(65) Prior Publication Data
US 2023/0233289 A1 Jul. 27, 2023

Related U.S. Application Data

(60) Provisional application No. 63/302,542, filed on Jan. 24, 2022.

(51) Int. Cl.
*A61C 7/08* (2006.01)
*A61C 7/14* (2006.01)

(52) U.S. Cl.
CPC ............... *A61C 7/08* (2013.01); *A61C 7/146* (2013.01)

(58) Field of Classification Search
CPC .... A61C 7/00; A61C 7/08; A61C 7/14; A61C 7/16; A61C 7/145
USPC ......................................... D24/152, 180, 181
See application file for complete search history.

(56) References Cited

U.S. PATENT DOCUMENTS

| D318,528 S | * | 7/1991 | Bjork | D24/180 |
| D833,016 S | * | 11/2018 | Wigal | D24/180 |
| 2003/0198911 A1 | * | 10/2003 | Knopp | B33Y 10/00 433/24 |
| 2016/0051341 A1 | * | 2/2016 | Webber | A61C 7/12 703/1 |
| 2016/0166357 A1 | * | 6/2016 | Portalupi | A61C 7/16 433/24 |
| 2016/0193014 A1 | * | 7/2016 | Morton | A61C 7/14 433/24 |
| 2016/0310235 A1 | * | 10/2016 | Derakhshan | A61C 7/002 |
| 2019/0298494 A1 | * | 10/2019 | Webber | A61C 7/145 |
| 2020/0188062 A1 | * | 6/2020 | Kopelman | A61C 7/14 |
| 2021/0169618 A1 | * | 6/2021 | Nishimuta | A61C 7/08 |

FOREIGN PATENT DOCUMENTS

KR 101877936 B1 * 2/2018

* cited by examiner

Primary Examiner — Jacqueline T Johanas
Assistant Examiner — Matthew P Saunders
(74) Attorney, Agent, or Firm — Barry Choobin; Patent 360

(57) ABSTRACT

A butterfly attachment to guide a clear aligner to grip a tooth. The butterfly attachment is formed by two substantially quarter sphere units, wherein each unit has a convex surface and a concave surface. The two units are merged at their convex edge mid portions, such that the convex surfaces are continuous and forms a front face resembling a valley shape. The rear face of the butterfly attachment formed by the concave surfaces is also continuous and concave that corresponds to contours of the tooth.

12 Claims, 2 Drawing Sheets

BUTTERFLY ATTACHMENT FOR CLEAR ALIGNER THERAPY IN ORTHODONTICS

CROSS-REFERENCE TO RELATED APPLICATIONS

This application claims priority from a U.S. Provisional Patent Appl. No. 63/302,542 filed on Jan. 24, 2022, which is incorporated herein by reference in its entirety.

FIELD OF INVENTION

The present invention relates to a butterfly attachment for use in orthodontics, and more particularly, the present invention relates to a butterfly attachment for use with clear aligners to grip and align teeth.

BACKGROUND

In recent years, clear aligner therapy has become the dominant choice of orthodontic treatment due to its better aesthetic and easier hygiene during treatment for a wide range of malocclusions. To express all types of tooth movements with aligners, attachments have been introduced. Attachments are tiny tooth-colored "bumps" that are bonded to the teeth using dental composites. These are placed at precise locations to allow the clear aligners to grip the teeth as they are guiding them to their new locations and have been demonstrated to result in desirable tooth movements. To date, different designs of the attachment have been introduced to be able to address distinct types of tooth movements with clear aligners. One of the major limitations of treatment with clear aligners is condoling the tooth movement where the correction needs a complex force system. Rotation, extrusion, and bodily movements are still considered challenging tooth movements using aligners.

The selection of the attachment design and its location is based on two main factors including the type of tooth movement, and the geometry of the target tooth. The thickness and shape of the attachments affect tooth movement. Previous studies in the literature investigated the effect of various designs of attachments. However, many times we would like to have two or three types of tooth movement at the same time on a specific tooth which makes the selection of optimized or traditional attachments a very difficult decision for clinicians. Due to a lack of clarification on the force/moment-transmission mechanism of aligners, the exact point of force insertion remains unclear in clear aligners.

Thus, a need is appreciated for a novel attachment for use with clear aligners to align and guide the teeth that overcome the drawbacks and limitations of the known attachments for clear aligners.

SUMMARY OF THE INVENTION

The following presents a simplified summary of one or more embodiments of the present invention to provide a basic understanding of such embodiments. This summary is not an extensive overview of all contemplated embodiments and is intended to neither identify critical elements of all embodiments nor delineate the scope of any or all embodiments. Its sole purpose is to present some concepts of one or more embodiments in a simplified form as a prelude to the more detailed description that is presented later.

In one aspect, disclosed is a butterfly attachment to guide a clear aligner to grip a tooth. The butterfly attachment is formed by two substantially quarter sphere units, wherein each unit has a convex surface and a concave surface. The two units are merged at their convex edge mid portions, such that the convex surfaces are continuous and forms a front face resembling a valley shape. The rear face of the butterfly attachment formed by the concave surfaces is also continuous and concave that corresponds to contours of the tooth.

In one aspect, disclosed is a butterfly attachment to guide a clear aligner to grip a tooth, the butterfly attachment includes a first substantially quarter sphere unit and a second substantially quarter sphere unit both merged at their convex edge mid portions, convex surfaces of the first substantially quarter sphere unit and the second substantially quarter sphere unit form a front face of the butterfly attachment, a rear face of the butterfly attachment formed by the first substantially quarter sphere unit and the second substantially quarter sphere unit is continuous and concave, the rear face corresponds to a contour of an outer surface of a tooth. Each of the first substantially quarter sphere unit and the second substantially quarter sphere unit has a proximal end and a distal end, wherein the first substantially quarter sphere unit and the second substantially quarter sphere unit are tilted with respect to each other such that a distance between the proximal ends is larger than a distance between the distal ends. The tilt is about 10 degrees. Aa top and a bottom of the butterfly attachment has a substantially V-shape depression. A left face and a right face of the butterfly attachment is flat. The convex surfaces of the front face form of a valley.

In one aspect, disclosed is a method to guide a clear aligner to grip a tooth. The method includes the steps providing the above butterfly attachment and planting the butterfly attachment on a tooth followed by a clear aligner.

BRIEF DESCRIPTION OF THE DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

DETAILED DESCRIPTION

Figure 1:
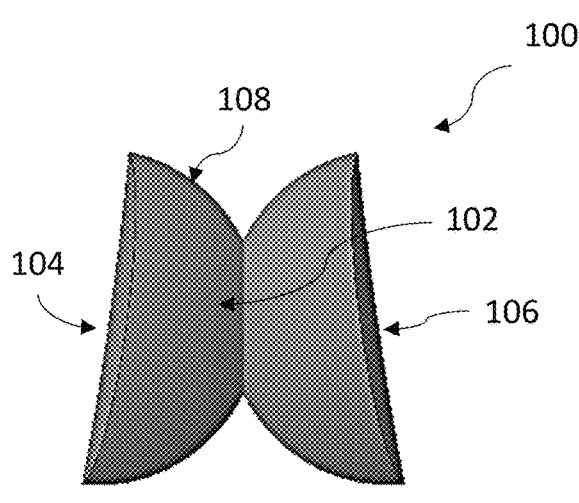
FIG. 1 is a front view of the disclosed butterfly attachment, according to an exemplary embodiment of the present invention.

Subject matter will now be described more fully hereinafter. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as apparatus and methods of use thereof. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely to illustrate the general principles of the invention since the scope of the invention will be best defined by the allowed claims of any resulting patent.

The following detailed description is described with reference to the drawings, wherein like reference numerals are used to refer to like elements throughout. In the following description, for purposes of explanation, specific details may be set forth in order to provide a thorough understanding of the subject innovation. It may be evident, however, that the claimed subject matter may be practiced without these specific details. In other instances, well-known structures and apparatus are shown in block diagram form in order to facilitate describing the subject innovation. Moreover, the drawings may not be to scale.

Disclosed is a novel universal design of attachment that could be used for combined types of tooth movements and could be customized for different tooth geometries including the anterior and posterior teeth. The disclosed butterfly attachments for use in orthodontics can be used with clear aligners for effective guiding and aligning of the teeth.

Referring to FIGS. 1-5 show an exemplary embodiment of the disclosed butterfly attachment. The attachment includes two substantially quarter sphere units merged at their convex edge portions, and the convex surfaces of the two-quarter sphere units form a front face of the attachment, as shown in FIG. 1. Each quarter sphere unit can have a proximal end and a distal end along a length of the quarter sphere unit. As shown in FIG. 1, the distance between the proximal ends of the quarter sphere units is smaller than the distance between the distal ends forming a butterfly shape. It is understood that certain embodiments have been described using quarter sphere units, however, the disclosed butterfly attachment can be integrally formed as a single unit.

Figure 2:
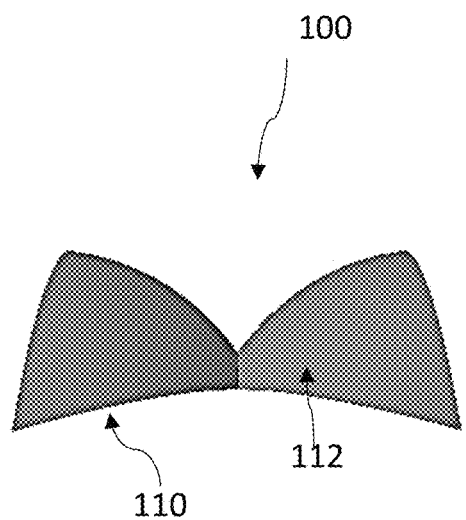
FIG. 2 is a bottom view of the butterfly attachment, according to an exemplary embodiment of the present invention.
Figure 3:
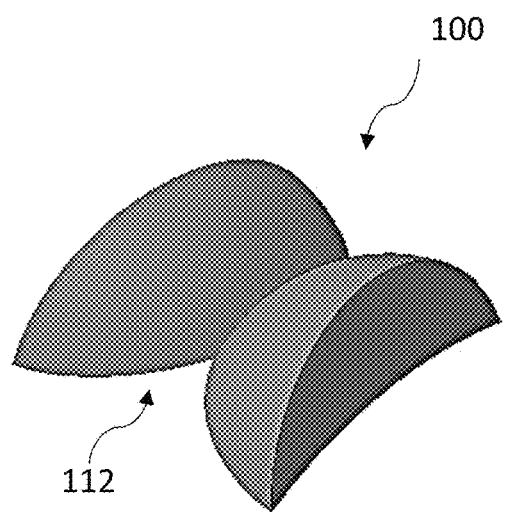
FIG. 3 is an isometric view of the butterfly attachment, according to an exemplary embodiment of the present invention.
Figures 4, 5:
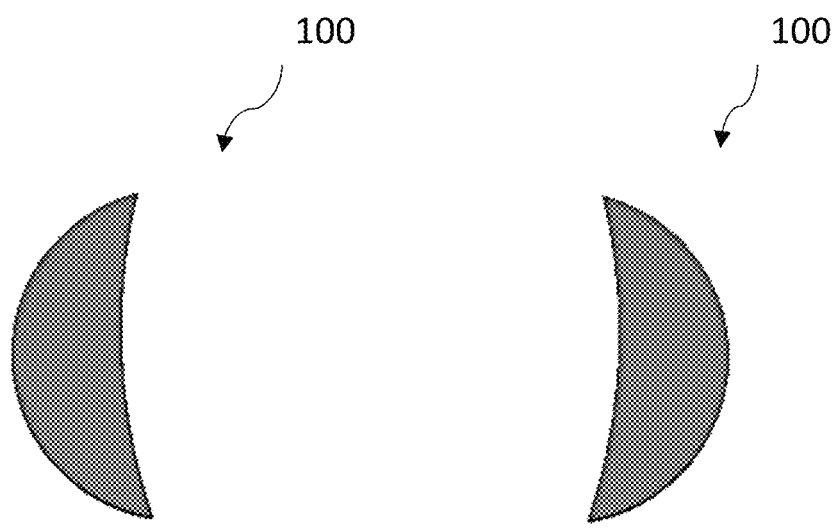
FIG. 4 is a left side view of the butterfly attachment, according to an exemplary embodiment of the present invention.
FIG. 5 is a right side view of the butterfly attachment, according to an exemplary embodiment of the present invention.

The rear surface of the butterfly attachment is shown in FIG. 2, the two substantially quarter sphere units are merged such as to form a continuous and concave rear surface. The disclosed butterfly attachment can be attached to a tooth at the rear face of the butterfly attachment. The concave rear surface of the disclosed butterfly attachment can correspond to a contour of an outer surface of a tooth over which the disclosed butterfly attachment can be mounted.

The front face can have two convex portions that form a valley, formed by the merging of the convex edge mid portions of the two quarter sphere units. The two quarter sphere units are slightly tilted outwards at the distal ends, so that distance between the distal ends can be larger than the distance between the proximal ends. In one implementation, the two quarter sphere units can be tilted to about 10 degrees. The two quarter sphere units are merged so that a continuous concave surface is formed at the rear of the butterfly attachment. The rear can be contoured to match the contours of a tooth.

The convex edge portions are not merged completely edge-to-edge but only the mid portions are merged, and the convex edge portions are along the convex and concave sides of the quarter sphere units. The top and bottom of the butterfly attachment have a substantially V-shaped depression. The left and right surfaces of the butterfly attachment can be flat.

The shape of the disclosed butterfly attachment can result in increasing the rate of rotation movement, as the rotations would not only be caused by predetermined mesiodistal force but also by vertical force derived from seating the aligners on the attachment's configurations. Considering the vertical slit as the female part of the attachment, this front valley configuration decreases the load-deflection rate due to the wedge effect. Additionally, the Occlusal-gingival undercut of the attachment and its 10-degree axial tapering structure can help prevent unwanted intrusion of the teeth and facilitate teeth track movement.

The disclosed butterfly attachment can be advantageous by preventing unwanted intrusion movement as a common side-effect in clear aligners, Rotation control/active movement: provide an accessible flat surface for the aligner to exert rotational force, extrusion control/active movement: angulated flat surfaces, bodily root movement (especially by modified version): available opposite surfaces to create required couple force and moment, an adequate combination of springiness and stiffness in aligner-attachment, adequate inter-attachment distance in aligners using this attachment, which makes the aligners fitting clinically acceptable, the possibility of customizing changes of the whole configuration of attachment based on the geometry of various teeth and their initial inclination of the tooth, the possibility of reducing the distance between the center of the tooth and the attachment to reduce the unwanted tipping and rotations.

REFERENCE NUMERALS

100: butterfly attachment
102: front face
104: left face
106: right face
108: convex edge
110: rear face
112: top face While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A butterfly attachment to guide a clear aligner to grip a tooth, the butterfly attachment comprises:
   a first substantially quarter sphere unit and a second substantially quarter sphere unit both merged at their convex edge mid portions,
   convex surfaces of the first substantially quarter sphere unit and the second substantially quarter sphere unit form a front face of the butterfly attachment, such that the convex surfaces are continuous,
   a rear face of the butterfly attachment formed by the first substantially quarter sphere unit and the second substantially quarter sphere unit is continuous and concave, the rear face corresponds to a contour of an outer surface of a tooth.

2. The butterfly attachment according to claim 1, wherein each of the first substantially quarter sphere unit and the second substantially quarter sphere unit has a proximal end and a distal end, wherein the first substantially quarter sphere unit and the second substantially quarter sphere unit are tilted with respect to each other such that a distance between the proximal ends is larger than a distance between the distal ends.

3. The butterfly attachment according to claim 2, wherein the tilt is about 10 degrees.

4. The butterfly attachment according to claim 1, wherein a top and a bottom of the butterfly attachment has a substantially V-shape depression.

5. The butterfly attachment according to claim 4, wherein a left face and a right face of the butterfly attachment is flat.

6. The butterfly attachment according to claim 5, wherein the convex surfaces of the front face form a V-shape valley.

7. A method for guiding a clear aligner to grip a tooth, the method comprising:
   providing a butterfly attachment comprising:
      a first substantially quarter sphere unit and a second substantially quarter sphere unit both merged at their convex edge mid portions, convex surfaces of the first substantially quarter sphere unit and the second substantially quarter sphere unit form a front face of the butterfly attachment, such that the convex surfaces are continuous, and
      a rear face of the butterfly attachment formed by the first substantially quarter sphere unit and the second substantially quarter sphere unit is continuous and concave, the rear face corresponds to a contour of an outer surface of a tooth;
   attaching the butterfly attachment to the tooth; and
   wearing the clear aligner, wherein the butterfly attachment guides the clear aligner to grip the tooth.

8. The method attachment according to claim 7, wherein each of the first substantially quarter sphere unit and the second substantially quarter sphere unit has a proximal end and a distal end, wherein the first substantially quarter sphere unit and the second substantially quarter sphere unit are tilted with respect to each other such that a distance between the proximal ends is larger than a distance between the distal ends.

9. The method according to claim 8, wherein the tilt is about 10 degrees.

10. The method according to claim 8, wherein a top and a bottom of the butterfly attachment has a substantially V-shape depression.

11. The method according to claim 10, wherein a left face and a right face of the butterfly attachment is flat.

12. The method according to claim 11, wherein the convex surfaces of the front face form a V-shape valley.

* * * * *